United States Patent Office 3,197,308
Patented July 27, 1965

3,197,308
PRESENSITIZED PRINTING PLATE AND PROCESS FOR USING SAME

Paul Stahlhofen, Wiesbaden, Germany, assignor, by mesne assignments, to Azoplate Corporation, Murray Hill, N.J., a corporation of New Jersey
No Drawing. Filed Oct. 11, 1962, Ser. No. 229,965
Claims priority, application Germany, Oct. 13, 1961, K 44,931
36 Claims. (Cl. 96—33)

The present invention relates to a material for the preparation of printing plates in which the light-sensitive coating contains vinyl or polyvinyl phosphonic acid esters which, when exposed imagewise, become insoluble in the parts affected by the light and after treatment with a solvent give a printing stencil which remains firmly adherent to the supporting material.

Polymers which become insoluble when exposed to light have already been produced and such compounds are relatively insensitive to light, so that for practical purposes it is necessary for catalysts to be added. These, however, reduce shelf life. Also, layers of the known type usually must be treated, after exposure, with organic solvents to remove the parts not affected by the light. Because of the known inflammability and noxious nature of many solvents, e.g., toluene and methylethyl-ketone, processes of this kind are not desirable.

Also, polyvinyl alcohol esters containing cinnamic acid groups have been recommended for layers to be used in reproduction processes. Such compounds, however, become readily insoluble to such an extent that the desired imagewise differentiation between the parts of the coating that remain soluble and those that become insoluble is not obtained to a sufficient degree.

In the present invention, a material for printing plates is provided which comprises a support having a reproduction coating, the latter containing at least one light-sensitive compound of the general formulae $$CH_2{=}CH-\overset{\displaystyle O}{\overset{\|}{\underset{\underset{\displaystyle OH}{|}}{P}}}-X-Y \quad \text{or} \quad \left[\begin{array}{c} CH_2-\overset{|}{\underset{|}{C}}H-\overset{\displaystyle O}{\overset{\|}{\underset{\underset{\displaystyle OH}{|}}{P}}}-X-Y \end{array}\right]_n$$

in which X may be:

$$-O-CH_2-CH_2-O-C_6H_4-CO-CH{=}CH-$$

$$-O-CH_2-CH_2-O-C_6H_4-CO-CH{=}CH-CH{=}CH-$$

$$-O-CH_2-CH_2-O-C_6H_4-CH{=}CH-CO-$$

or $$-O-CH_2-CH_2-O-C_6H_4-CH{=}CH-CO-CH{=}CH-$$

Y is a mononuclear or multinuclear aromatic group, which may be substituted, or a heterocyclic group, which may be substained, and $n$ is a whole number greater than 1.

Suitable Y groups are, for example: the phenyl group, the methoxyphenyl group, the methylene dihydroxyphenyl group, the dialkylamino group, such as dimethylamine phenyl and diethylamino phenyl, the 3-methoxy-4-hydroxy phenyl group, the 4-carboxymethoxyphenyl group, the nitrophenyl group, the chlorophenyl group, the 2-hydroxy-5-methyl phenyl group, the bromophenyl group, the napthyl group, the β-hydroxy napthyl group, the pyridyl group, the furfuryl group, the thiophene group, the methyl pyridine group, the ethyl furfuryl group and the 2-methyl thiophene group.

In accordance with the invention, use can be made of both the vinyl and the polyvinyl-mono-phosphonic acid esters which contain an unsaturated group in the ester grouping such as described above. A special feature, apart from the vinyl or polyvinyl phosphonic acid grouping, is the —CO—CH=CH— grouping, which imparts to the compounds an especially high light-sensitivity. Light-sensitive compounds in which, according to the above formulae, one of the X groups is $$-O-CH_2-CH_2-O-C_6H_4-CO-CH{=}CH-$$

$$-O-CH_2-CH_2-O-C_6H_4-CO-CH{=}CH-CH{=}CH-$$

or $$-O-CH_2-CH_2-O-C_6H_4-CH{=}CH-CO-$$

and one of the Y groups is phenyl, p-methoxyphenyl, or 3,4-methylene dihydroxyphenyl are distinguished by extremely good light-sensitivity.

Exemplary of the compounds of the invention are:

FORMULA 1

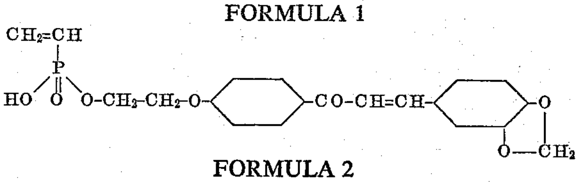

FORMULA 2

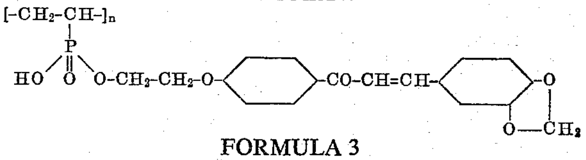

FORMULA 3

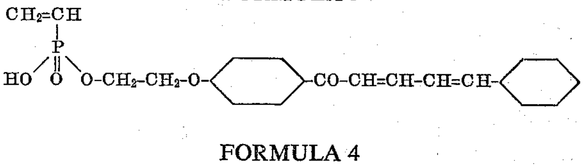

FORMULA 4

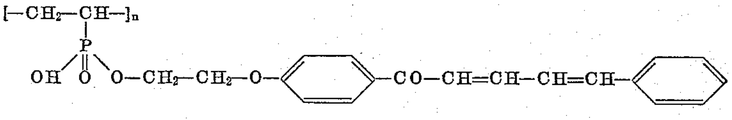

FORMULA 5

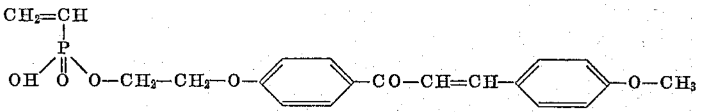

FORMULA 6

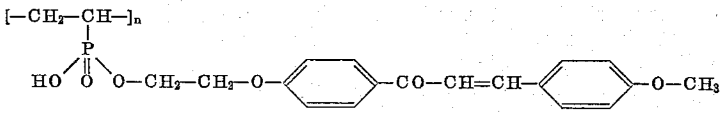

FORMULA 7

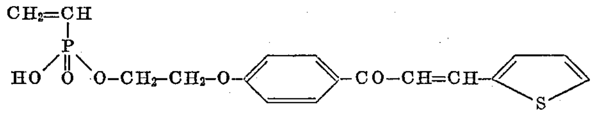

FORMULA 8

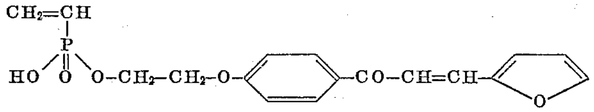

FORMULA 9

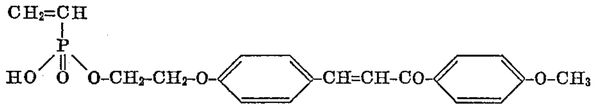

FORMULA 10

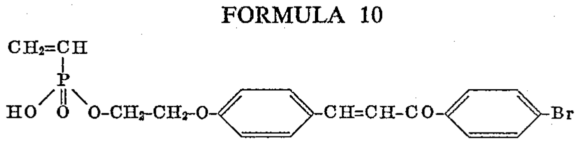

FORMULA 11

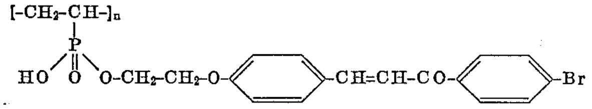

FORMULA 12

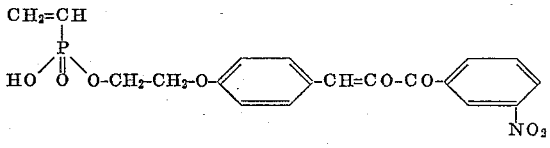

In the preparation of the vinyl phosphonic acid monoesters, molar quantities of hydroxyalkyl ethers corresponding to the variously substituted chalcones designated as the —X—Y group in the general formulae detailed above are reacted with vinyl phosphonic acid dichloride in an inert, anhydrous solvent, preferably in the presence of an acid-binding agent, e.g., tertiary organic bases such as pyridine or N-methyl piperidine. One of the reaction components may be used in slight excess. Proportions of the corresponding di-esters may also be formed. This can be advantageous, particularly as cross-linking can be thereby increased and tendencies to crystallization reduced, although, normally, molar quantities are used in most cases. The resultant reaction product is treated with water to saponify the second chlorine atom of the vinyl phosphonic acid dichloride, whereupon the vinyl phosphonic acid monoesters are obtained in good yield.

The 4-($\beta$-hydroxy-ethoxy)-chalcones are obtained by the reaction of molar quantities of $\beta$-hydroxy-ethoxy-acetophenone with a corresponding aldehyde in the presence of an alkaline condensation agent, e.g., 10% sodium methylate or 20% to 40% potassium hydroxide solution. In some cases, hydrogen chloride is an excellent condensation agent. As aldehydes, mono and multinuclear aromatic isocyclic and heterocyclic aldehydes, which may be substituted, are particularly suitable, e.g., benzaldehyde, 4 - methoxybenzaldehyde, piperonal, 4-dimethyl-amino-benzaldehyde, 4-diethylamino-benzaldehyde, 4-nitrobenzaldehyde, 3-nitrobenzaldehyde, 2-chlorobenzaldehyde, vanillin, 3,4-dihydroxybenzaldehyde, cinnamaldehyde, 6-hydroxy-naphthaldehyde-1, 4-carboxymethoxy benzaldehyde, 4-pyridine aldehyde, furfural and thiophene-2-aldehyde.

For the preparation of the $\omega$-[4-$\beta$-hydroxy-ethoxy)-chalcones], 4-($\beta$-hydroxy-ethoxy)-benzaldehyde and an acetophenone derivative substituted in the nucleus are reacted in the presence of an alkaline condensation agent, e.g., 10% aqueous sodium hydroxide solution. Apart from acetophenone itself, compounds particularly suitable are: p-bromacetophenone, p - chloracetophenone, meta-nitroacetophenone, 4-methoxyacetophenone and anisalacetone.

Vinyl phosphonic acid dichloride is prepared in accordance with German Patent 1,020,019, by the reaction at elevated temperature of vinyl phosphonic acid diester with phosphorus pentachloride in molecular proportions of about 1:2 or, in accordance with published German patent application (deutsche Auslegeschrift) 1,103,922, from ethylene and phosphorus trichloride in the presence of oxygen. As with the preparation of the vinyl phosphonic acid monoesters of the invention, the corresponding polyvinyl phosphonic acid monoesters, which can be used with equally good results for the preparation of reproduction coatings for printing plates, result from reaction with polyvinyl phosphonic acid dichloride. Polyvinyl phosphonic acid dichloride is readily obtained if vinyl phosphonic acid dichloride is heated for a number of hours in an inert solvent such as benzene, dioxane or ethyl acetate at 70–90° C. in the presence of a polymerization catalyst such as benzoyl peroxide or azobisisobutyric acid nitrile.

A clear, yellowish, viscous solution is formed which, once polymerization is completed, can be stored at 0° C. for a number of months without undergoing change. This solution can be used immediately for further reaction. By dropwise introduction of the solution into petroleum ether, the polymer can be precipitated. The vinyl and polyvinyl phosphonic acid monoesters are readily soluble in organic solvents such as acetone, methanol, dioxane, glycol monomethyl ether, dimethyl formamide and also in aqueous alkalis, some of them also being readily soluble in water.

For the preparation of reproduction coatings, appropriate solutions of the vinyl or polyvinyl monophosphonic acid esters are applied to supports, e.g., foils or plates made of metals such as aluminum, zinc, copper and magnesium or plates composed of more than one layer of such metals, e.g., bimetal and trimetal plates, or to paper or glass. Mixtures of several of the esters to be used in accordance with the invention can also be applied.

If reproduction coatings of this sort are exposed behind a master to a carbon arc lamp, the parts affected by the light become insoluble in certain solvents while the parts of the reproduction coating not affected by the light can be removed with suitable solvents or water. The resultant image which is an insoluble cross-linked polymer relief of the light-decomposition products can be inked up with greasy ink. In this way, printing plates can be produced in which the insoluble light decomposition product, after being inked up with greasy ink, gives final prints in which the image is a negative of the master. Before the printing process the image can, where necessary, be strengthened by the application of a lacquer.

In addition to the vinyl or polyvinyl monophosphonic acid esters, the reproduction coatings may also contain natural or synthetic resins, e.g., shellac, colophony, phenol-formaldehyde resins, interpolymers from maleic acid anhydride and styrene or from vinyl chloride, vinyl acetate and maleic acid anhydride. Also, in some cases, the use of a cross-linking agent is possible, e.g., dicinnamylidene acetone or N,N'-methylene-bis-acrylamide. These cross-linking agents serve to increase the molecular weight and hence to increase the physical hardness of the polymerizates obtained by photopolymerization.

The vinyl or polyvinylphosphonic acid esters of the invention possess outstanding shelf life. Even after being stored for a number of months they can be processed under the usual conditions, while printing plates prepared with the known chalcone compounds of a high molecular weight and free of phosphorous begin to crystallize after even brief storage. Even at elevated temperatures the compounds are extraordinarily stable. It is possible for completely satisfactory copies to be prepared with the coatings even after the material has been kept for eight hours at 100° C. The developing process is for all practical purposes unaffected.

In the case of the compounds known from the literature, the speed of cross-linking under the influence of ultraviolet rays is relatively poor so that it is necessary for suitable catalysts to be used to increase the light sensitivity. In contrast, the vinyl or polyvinyl phosphonic acid monoesters have considerably better light sensitivity so that sensitizers or catalysts to increase light sensitivity are not necessary—a fact which has a very favorable effect on shelf life. Moreover, the esters of the invention are readily soluble in organic solvents but, after exposure, become to a high degree insoluble, so that the removal of the unexposed parts during development can be effected without difficulty and good differentiation is obtained between the exposed and unexposed parts of the coating.

For development, the reproduction coatings are treated with aqueous, weakly alkaline solvents. It is often sufficient for the exposed printing plate to be sprayed down with water, whereupon the printing stencil immediately becomes visible; after-treatment with dilute phosphoric acid to increase water-acceptance is advantageous.

The resultant printing plates possess great mechanical resistance, so that long runs can be obtained. Also, the printing plates are resistant to strong acids, e.g., 60% phosphoric acid or 60% sulfuric acid or 5% nitric acid, so that they can be used in chemigraphy for firm layers for relief and gravure printing. Further, because of the hydroxyl group linked to the phosphorus atom, the esters have an acid character. Consequently, the esters can enter into a salt-like combination with metal supports, e.g., aluminum, and adherence to the support is thus considerably improved. The phosphonic acid esters have, in addition to good film-forming properties, a high degree of sensitivity to actinic light. Cross-linking can be effected by means of an arc lamp, mercury vapor lamps and even by powerful filament lamps.

In the following examples, the unit of volume is milliliters where grams are the unit of weight.

*Example 1*

1 part by weight of the compound corresponding to Formula 1 is dissolved in 100 parts by volume of glycol monomethyl ether and this solution is coated upon a mechanically roughened aluminum foil. The foil is dried in a hot air stream and then for about 1 to 2 minutes at 100° C. The foil thus sensitized is exposed under a negative master for two minutes. For this purpose, an 18-amp enclosed carbon arc lamp is used at a distance of about 70 cm. For the development of the image produced on the coated layer, the exposed side of the foil is sprayed down with water, whereupon the image or printing stencil becomes visible in yellow on metal ground. To increase the water-acceptance of the supporting material in the bared parts, the water-developed foil is treated by means of a cotton pad with an aqueous 0.05% solution of sodium metasilicate, or an aqueous 1% solution of sodium hexafluosilicate, or 0.1% fluosilicic acid or 60% phosphoric acid. The foil thus treated can be immediately inked up with greasy ink and from the resultant printing plate, copies can be produced in a printing machine.

For the preparation of the compound corresponding to Formula 1, 31.2 parts by weight (0.1 mole) of 4-(β-hydroxy-ethoxy)-ω-piperonylidene acetophenone are dissolved while hot in 700 parts by volume of anhydrous acetone; 8 parts by weight of anhydrous pyridine are added. 14.5 parts by weight (0.1 mole) of vinyl phosphonic acid dichloride are then introduced dropwise, with vigorous stirring, and the reaction solution is maintained under reflux at the boiling point for 1 to 2 hours. The solvent is distilled off and the remaining oil is mixed well with 75 parts by volume of 2 N hydrochloric acid, with cooling by ice. After a brief time, the reaction product precipitates out in solid form; it is filtered off with suction, washed with water, and dried on clay. From toluene, yellow prisms are obtained which melt at 148–149° C.

4-(β-hydroxyethoxy)-ω-piperonylidene acetophenone is readily obtained in good yield when molar quantities of 4-(β-hydroxyethoxy)-acetophenone and piperonal are reacted in an alcoholic solution at room temperature in the presence of aqueous sodium hydroxide. From methanol, yellow prisms which melt at 142° C. are obtained.

*Example 2*

1 part by weight of the compound corresponding to Formula 2 is dissolved in 100 parts by volume of glycol monomethyl ether and this solution is coated upon a mechanically roughened aluminum foil. The foil is dried in a hot air stream and then for about 1 to 2 minutes at 100° C. The sensitized foil is exposed for 2 minutes under a negative master and for this purpose an 18-amp enclosed carbon arc lamp is used at a distance of about 70 cm. For the developement of the image, which is already clearly delineated, the exposed side of the foil is sprayed down with water and the image corresponding to the master appears in yellow on metal ground. To increase the water-acceptance of the supporting material, the foil is treated with a 0.5% aqueous sodium metasilicate solution and is then inked up with greasy ink. From the resultant printing plate, prints can be produced in a printing machine.

For the preparation of the compound corresponding to Formula 2, 31.2 parts by weight (0.1 mole) of 4-(β-hydroxy-ethoxy)-ω-piperonylidene acetophenone are dissolved while hot in 700 parts by volume of anhydrous acetone; 8 parts by weight of anhydrous pyridine are added. With vigorous stirring, 37.7 parts by weight (0.13 mole) of a 50% solution of polyvinyl phosphonic acid dichloride in benzene are introduced dropwise. The reaction solution is then maintained at the boiling point, under reflux, for about 2 hours. The solvent is distilled off on a water both and the oily residue is well mixed with about 75 parts by volume of 2 N hydrochloric acid, with cooling by ice. After the mixture has been allowed to stand for a short time at room temperature, the reaction product separates out in solid form. The polyvinyl phosphonic acid monoester can be reprecipitated from xylene.

For the preparation of polyvinyl phosphonic acid dichloride, 100 parts by weight of vinyl phosphonic acid dichloride are dissolved in 100 parts by volume of anhydrous benzene, and, in the presence of 1 part by weight of azo bi-isobutyric acid nitrile, the mixture is maintained, under reflux, at the boiling point for about 16 hours, with vigorous stirring. A clear, yellowish, viscous solution is formed which can be used immediately for further reactions. The solution can be maintained at 0° C. for a considerable time without undergoing any change. By the dropwise introduction of the benzene solution into petroleum ether, the polymeric vinyl phosphonic acid dichloride can be precipitated.

*Example 3*

1 part by weight of the compound corresponding to Formula 3 is dissolved in 100 parts by volume of glycol-monomethyl ether and this solution is coated upon a mechanically roughened aluminum foil. The foil is dried in a hot air stream and then further dried for about 2 minutes at about 100° C. The sensitized foil is exposed for 2 minutes under a negative master to an 18-amp enclosed carbon arc lamp at a distance of 70 cm. For the development of the image produced on the coating, the exposed side of the foil is sprayed down well with water, whereupon the image corresponding to the master immediately appears in yellow on metal ground. To increase the water-acceptance of the supporting material, the foil is then treated with a 1% aqueous sodium hexafluosilicate solution or with 0.1% fluosilicic acid; a 60% phosphoric acid solution is also excellent for this purpose. The image parts consist of an oleophilic stencil which, when inked up with greasy ink by hand or in one of the usual printing machines, readily takes up ink, while the image-free parts have hydrophilic character and repel the ink. From the resultant printing plate, copies can be prepared in a printing machine.

For the preparation of the compound corresponding to Formula 3, 29.4 parts by weight (0.1 mole) of 4-(β-hydroxy-ethoxy)-ω-cinnamylidene-acetophenone are dissolved in 500 parts by volume of anhydrous acetone; 8 part by weight of anhydrous pyridine are added. 15 parts by weight (0.103 mole) of vinyl phosphonic acid dichloride are then introduced dropwise, with vigorous stirring, and the reaction mixture is maintained under reflux at the boiling point for 1 to 2 hours. The solvent is then distilled off and the oil which remains is mixed thoroughly with about 75 parts by volume of 2 N hydrochloric acid. After a brief time, the reaction product separates out in solid form; it is filtered off with suction, washed with water and dried on clay. From toluene, yellow prisms melting at 142–143° C. are obtained.

For the preparation of 4-(β-hydroxyethoxy)-ω-cinnamylidene acetophenone, 18 parts by weight (0.1 mole) of 4-(β-hydroxyethoxy)-acetophenone and 13.2 parts by weight (0.1 mole) of cinnamaldehyde are dissolved in 50 parts by volume of alcohol. 20 parts by volume of 20% sodium hydroxide solution are introduced dropwise with good stirring. After the mixture has been allowed to stand for a number of hours, the chalcone is filtered off with suction, washed with alcohol and recrystallized from xylene or benzene. Yellow prisms melting at 128° C. are obtained.

*Example 4*

1 part by weight of the compound corresponding to Formula 4 is dissolved in 100 parts by volume of glycol monomethyl ether and this solution is coated upon a mechanically roughened aluminum foil. The foil is dried in a hot air stream and then further dried for about 2 minutes at 100° C. The sensitized foil is exposed under a negative master for 2 minutes to an 18-amp enclosed carbon arc lamp at a distance of 70 cm. For the development of the image produced on the coating, the exposed side of the foil is treated with a cotton pad soaked in triglycol; the image appears immediately in yellow on metal ground. The foil thus developed is rinsed down with water and then wiped over with an aqueous 5% sodium metasilicate solution to increase the water-acceptance of the supporting material in the bared parts. After the printing stencil has been inked up with greasy ink, copies can be made in a printing machine with the printing plate thus produced.

For the preparation of the compound corresponding to Formula 4, 29.4 parts by weight (0.1 mole) of 4-(β-hydroxy-ethoxy)-ω-cinnamylidene-acetophenone are dissolved in 200 parts by volume of anhydrous pyridine. To this solution, 37.7 parts by weight (0.13 mole) of a 50% benzene solution of polyvinyl phosphonic acid dichloride are added dropwise, at room temperature, with vigorous stirring. The pyridine hydrochloride slowly precipitates out; stirring is continued for 2 hours and then the reaction solution is filtered. After acidification, the yellow polymeric reaction product precipitates from the solution; it is filtered off with suction and washed well with water. It is advantageous for the reaction product to be further stirred for about one hour in dilute hydrochloric acid to remove small quantities of residual pyridine.

*Example 5*

1 part by weight of the compound corresponding to Formula 5 is dissolved in 100 parts by volume of glycol monomethyl ether and this solution is coated upon a mechanically roughened aluminum foil. The foil is dried in a hot air current and then further dried for about 2 minutes at 100° C. The sensitized foil is exposed under a negative master for about 2 minutes to an enclosed carbon-arc lamp as in Examples 1 to 4. For the development of the image produced on the coating, the exposed side of the foil is sprayed down with water, whereupon the image corresponding to the master immediately appears. The foil is then treated by means of a cotton pad with 0.1% fluosilicic acid or with 0.3% aqueous sodium hexafluosilicate solution or with 40% phosphoric acid to increase the water-acceptance of the supporting material. After the printing stencil has been inked up with greasy ink, copies can be made in a printing machine from the printing plate thus obtained.

For the preparation of the compound corresponding to Formula 5, 29.8 parts by weight (0.1 mole) of 4-(β-hydroxyethoxy)-ω-anisylidene-acetophenone are dissolved in about 700 parts by volume of acetone; 10 parts by weight of anhydrous pyridine are added. 18.8 parts by weight (0.13 mole) of vinyl phosphonic acid dichloride are added dropwise, with good stirring, and the reaction solution is maintained at the boiling point for two hours. The solvent is distilled off and the oily reaction product which remains is intimately mixed, with care, with about 75 parts by volume of 2 N hydrochloric acid. After a brief time, the vinyl phosphonic acid monoester separates out in solid form. It is filtered off with suction, washed well with water and recrystallized from benzene. Light yellow prisms which melt at 124.5° C. are obtained.

4-(β-hydroxyethoxy)-ω-anisylidene acetophenone is obtained in good yield by the reaction at room temperature of molar quantities of 4-(β-hydroxyethoxy)-acetophenone and 4-methoxy-benzaldehyde in alcoholic solution in the presence of aqueous sodium hydroxide. From benzene or methanol the chalcone crystallizes in the form of yellow crystals which melt at 111° C.

*Example 6*

1 part by weight of the compound corresponding to Formula 6 is dissolved in 100 parts by volume of glycol monomethyl ether or dimethyl formamide and this solution is coated upon a mechanically roughened aluminum foil. The foil is dried in a hot air current and then further dried for about 2 minutes at 100° C. The sensitized foil is exposed for 2 minutes under a negative master to a 40-amp open reproduction arc-lamp at a distance of 100 cm. For development of the image produced on the coating, the foil is wiped over with a 1% aqueous sodium metasilicate solution using a cotton pad, until the image corresponding to the master becomes clearly visible. After the printing stencil has been inked up with greasy ink, copies can be made in a printing machine with the printing plate thus obtained.

For the preparation of the compound corresponding to Formula 6, 29.8 parts by weight (0.1 mole) of 4-β-hydroxyethoxy)-ω-anisylidene acetophenone are dissolved in about 800 parts by volume of anhydrous acetone; 10 parts by weight of anhydrous pyridine are added. Into this solution, 40.6 parts by weight (0.14 mole) of a 50% benzene solution of polyvinyl phosphonic acid dichloride are introduced at room temperature with good stirring. The reaction solution is then maintained under reflux at the boiling point for 2 hours. The solvent is distilled off and the oily residue is intimately mixed, with care, with about 75 parts by volume of 2 N hydrochloric acid. After a brief time, the polyvinyl phosphonic acid monoester precipitates out in the form of a yellow reaction product. It is filtered off with suction, washed well with water and dried on clay.

*Example 7*

1 part by weight of the compound corresponding to Formula 7 is dissolved in 100 parts by volume of glycol monomethyl ether and this solution is coated upon a mechanically roughened aluminum foil. The foil is dried in a hot air current and then further dried for 2 minutes at 100° C. The sensitized foil is exposed for 3 minutes under a negative master to an open 40-amp reproduction arc-lamp at a distance of 100 cm. For the development of the image produced on the coating, the exposed side of the foil is sprayed down well with water, whereupon the image corresponding to the master becomes clearly visible in yellow on metal ground. To increase the water-acceptance of the supporting material, the foil is treated by means of a cotton pad with one of the following solutions: 0.1% fluosilicic acid, 0.5% sodium hexafluosilicate or 0.03% sodium metasilicate solution. After this treatment, the printing foil can be inked up with greasy ink and set up in a suitable printing machine.

For the preparation of the compound corresponding to Formula 7, 27.4 parts by weight (0.1 mole) of 4-($\beta$-hydroxyethoxy)-$\omega$-thenylidene acetophenone are dissolved in 200 parts by volume of anhydrous acetone and, after the addition of 8 parts by weight of pyridine, 14.5 parts by weight (0.1 mole) of vinyl phosphonic acid dichloride are added dropwise and with vigorous stirring. The solution is then maintained under reflux at the boiling point for about 2 hours on a steam bath. The solvent is distilled off and the oily residue is intimately mixed, with care, with about 70 parts by volume of 2 N hydrochloric acid. After a brief time, the vinyl phosphonic acid monoester separates out in solid form. From toluene, it crystallizes in the form of colorless prisms which melt at 119–120° C.

For the preparation of 4-($\beta$-hydroxyethoxy)-$\omega$-thenylidene acetophenone, 18 parts by weight (0.1 mole) of 4-($\beta$-hydroxyethoxy)-acetophenone and 11.2 parts by weight (0.1 mole) of thiophene-(2)-aldehyde are dissolved in 100 parts by volume of alcohol. 10 parts by volume of a 40% sodium hydroxide solution are then introduced slowly, with vigorous stirring, during which time the temperature of the reaction solution rises somewhat. After about two hours, the mixture is diluted with water and the oil which then separates out solidifies after a short while. The chalcone is filtered off with suction, well washed with water and dried on clay. From benzene, it is obtained in the form of yellow prisms which melt at 95° C.

*Example 8*

1 part by weight of the compound corresponding to Formula 8 is dissolved in 100 parts by volume of glycol monomethyl ether and this solution is coated upon a mechanically roughened aluminum foil. The foil is dried in a hot air current and then further dried for about 2 minutes at 100° C. The sensitized foil is exposed for 3 minutes under a negative master to an 18-amp enclosed carbon arc lamp at a distance of 70 cm. For the development of the image produced on the coating and already visible, the exposed side of the foil is sprayed down well with water and treated by means of a cotton pad with a 0.1% fluosilicic acid to increase water-acceptance. After the printing stencil has been inked up with greasy ink, copies can be made in a printing machine with the printing plate thus obtaned.

For the preparation of the compound corresponding to Formula 8, 25.8 parts by weight (0.1 mole) of 4-($\beta$-hydroxyethoxy)-$\omega$-furfurylidene acetophenone and 8 parts by weight of pyridine are dissolved in 200 parts by volume of anhydrous acetone. 18.8 parts by weight (0.13 mole) of vinyl phosphonic acid dichloride are then introduced with vigorous stirring and the mixture is heated to the boiling point, under reflux, for two hours. After the solvent has been distilled off, the oily residue is intimately mixed with about 50 parts by volume of 2N hydrochloric acid. After a brief time, the reaction product separates out in solid form and, after drying is recrystallized from toluene. The vinyl phosphonic acid monoester is obtained in the form of light yellow crystals which melt at 127–128° C.

For the preparation of 4-($\beta$-hydroxyethoxy)-$\omega$-furfurylidene acetophenone, 18 parts by weight (0.1 mole) of 4-($\beta$-hydroxyethoxy)-acetophenone and 9.6 parts by weight (0.1 mole) of furfural are dissolved in 70 parts by volume of alcohol; 10 parts by volume of a 40% sodium hydroxide solution are slowly introduced with good stirring. After the reaction solution has stood for two hours at room temperature, it is diluted with an equal quantity of water. After a brief time, the oil which separates out solidifies; it is filtered off with suction, washed with water and dried on clay. When reprecipitated from benzene it has the form of yellow needles which melt at 87–88° C.

*Example 9*

1 part by weight of the compound corresponding to Formula 3 and 0.5 part by weight of an interpolymer from vinyl chloride, vinyl acetate and maleic acid which is commercially available under the trademark "Hostalit" CAM are dissolved in 100 parts by volume of a mixture of 60 parts by volume of glycol monomethyl ether and 40 parts by volume of dimethyl formamide. This solution is coated in known manner upon a mechanically roughened aluminum foil; the foil is dried in a hot air current and then further dried for about 2 minutes at 100° C. The foil thus sensitized is exposed for 2 minutes under a negative master to an 18-amp enclosed carbon arc lamp at a distance of 70 cm. For the development of the image produced on the coating and already delineated, the exposed side of the foil is sprayed down with water until the image corresponding to the master is clearly outlined in yellow on metal ground. Before being inked up with greasy ink, the foil is treated with 3% fluosilicic acid or an aqueous 0.1% sodium metasilicate solution to increase water-acceptance. Copies can be made in a printing machine from the resultant printing plate.

*Example 10*

1 part by weight of the compound corresponding to Formula 3 and 0.5 part by weight of an alkali-soluble phenol-formaldehyde novolak modified with chloroacetic acid are dissolved in 100 parts by volume of a mixture containing 60 parts by volume of glycol monomethyl ether and 40 parts by volume of dimethyl formamide. This solution is coated upon a mechanically roughened aluminum foil by known methods. The foil is dried in a hot air current and then further dried for about 2 minutes at 100° C. The sensitized foil is exposed for 2 minutes behind a negative master to an 18-amp enclosed carbon arc lamp at a distance of 70 cm. For the development of the image produced on the coating, the foil is sprayed down with water and then treated by means of a cotton pad with an aqueous 0.2% sodium metasilicate solution, to increase water acceptance. After the image has been inked up with greasy ink, copies can be prepared in a printing machine with the resultant printing plate.

*Example 11*

1 part by weight of the compound corresponding to Formula 9 is dissolved in 100 parts by volume of glycol monomethyl ether and this solution is coated upon a mechanically roughened aluminum foil. The foil is dried in a hot air current and then further dried for about 2 minutes at 100° C. The sensitized foil is exposed under a negative master for 2 minutes to an 18-amp enclosed carbon arc lamp at a distance of 70 cm. For the development of the image produced on the coated layer, the exposed side of the foil is sprayed down well with water and then treated with 3% fluosilicic acid or 5% phosphoric acid containing 0.5% sodium silicofluoride, to increase water-acceptance; 50% phosphoric acid is also excellent for this purpose. The image parts consist of an oleophilic stencil which, when inked up with greasy ink, readily accepts ink while the image-free parts are hydrophilic and repel the ink. From the resultant printing plate, copies can be prepared in a printing machine.

For the preparation of the compound corresponding to

Formula 9, 29.8 parts by weight (0.1 mole) of 4-methoxy-ω-(4-hydroxyethoxy benzylidene)-acetophenone and 10 parts by weight of pyridine are dissolved in about 400 parts by volume of anhydrous acetone. 18.8 parts by weight (0.18 mole) of vinyl phosphonic acid dichloride are added slowly, with vigorous stirirng, and the reaction solution is heated, under reflux, on a steam bath for two hours. The solvent is distilled off and then the oily reaction product which remains is intimately mixed, with care, with about 70 parts by volume of 2 N hydrochloric acid. After the mixture has been allowed to stand for a short time, the vinyl phosphonic acid monoester separates out in solid form; it is filtered off with suction, washed with water and dried on clay. From benzene, colorless crystals which melt at 141° C. are obtained.

4-methoxy-ω-(4-hydroxyethoxy benzylidene)-acetophenone is obtained in good yield when molar quantities of 4-(β-hydroxyethoxy) benzaldehyde and 4-methoxy acetophenone are reacted at room temperature in alcoholic solution in the presence of aqueous sodium hydroxide. Light yellow crystals which melt at 108° C. are obtained by recrystallization from benzene.

*Example 12*

1 part by weight of the compound corresponding to Formula 10 is dissolved in 100 parts by volume of glycolmonomethyl ether or dimethyl formamide and this solution is coated upon a mechanically roughened aluminum foil. The foil is dried in a hot air stream and then further dried for 2 minutes at 100° C. The sensitized foil is exposed for 2 minutes under a negative master to a 40-amp open reproduction arc lamp at a distance of 100 cm. For development of the image produced on the coated layer, the foil is wiped over by means of a cotton pad with a 1% aqueous sodium metasilicate solution. After the printing stencil has been inked up with greasy ink, copies can be prepared in a printing machine with the resultant printing plate.

For the preparation of the compound corresponding to Formula 10, 34.7 parts by weight (0.1 mole) of 4-bromo-ω-(4-hydroxyethoxybenzylidene) - acetophenone and 10 parts by weight of pyridine are dissolved in about 250 parts by volume of anhydrous acetone. 18.8 parts by weight (0.1 mole) of vinyl phosphonic acid dichloride are introduced dropwise with vigorous stirring and the reaction solution is then heated, under reflux, at the boiling point for 2 hours. After the solvent has been distilled off, the oily reaction product which remains is mixed well, with care, with about 70 parts by volume of 2 N hydrochloric acid. The vinyl phosphonic acid monoester separates out after a short time in solid form. It is filtered off, with suction, washed with water and dried on clay. From methanol, it crystallizes in light yellow prisms which melt at 177° C.

4-bromo-ω-(4-hydroxyethoxybenzylidene) - acetophenone is obtained in good yield when molar quantities of 4-(β-hydroxyethoxy) - benzaldehyde and 4-bromo-acetophenone are reacted at room temperature in alcoholic solution in the presence of 10 parts by volume of 10% sodium hydroxide solution. From alcohol, the chalcone crystallizes in the form of yellow prisms which melt at 130° C.

*Example 13*

1 part by weight of the compound corresponding to Formula 11 is dissolved in 100 parts by volume of glycol monomethyl ether and this solution is coated upon a mechanically roughened aluminum foil. The foil is dried in a hot air current and then further dried for about 2 minutes at 100° C. The sensitized foil is exposed for 2 minutes under a negative master to a 40-amp open reproduction arc lamp at a distance of 100 cm. For development of the image produced on the coated layer, the foil is sprayed down well with water or wiped over by means of a cotton pad with an aqueous 0.5% sodium metasilicate solution. Before the inking up process, it is advantageous for the foil to be treated with 60% phosphoric acid. From the resultant printing plate copies can be made in a printing machine.

For the preparation of the compound corresponding to Formula 11, 34.7 parts by weight (0.1 mole) of 4-bromo-ω-(4 - hydroxyethoxybenzylidene) - acetophenone and 10 parts by weight of pyridine are dissolved in 250 parts by volume of anhydrous acetone. Into this solution, 37.7 parts by weight (0.13 mole) of a 50% benzene solution of polyvinyl phosphonic acid dichloride are introduced dropwise at room temperature, with vigorous stirring. The reaction solution is maintained, under reflux, at the boiling point for an additional 2 hours and then filtered off from the pyridine hydrochloride. The solvent is distilled off and the oily residue is well mixed, with care, with about 70 parts by volume of 2 N hydrochloric acid. After a short time the polymeric vinyl phosphonic acid ester separates out in solid form. It is filtered off with suction, well washed with water and dried on clay.

*Example 14*

1 part by weight of the compound corresponding to Formula 12 is dissolved in 100 parts of volume of glycol monomethyl ether and this solution is coated upon a mechanically roughened aluminum foil by known methods. The foil is dried in a hot air current and then further dried for about 2 minutes at 100° C. The sensitized foil is exposed for 3 minutes under a negative master. For this purpose, an enclosed 18-amp carbon arc lamp is used at a distance of about 70 cm. For development of the image produced on the coated layer, the exposed side of the foil is treated by means of a cotton pad with an aqueous 0.2% sodium metasilicate solution. After the inking up process, copies can be made in a printing machine from the resultant printing plate.

For the preparation of the compound corresponding to Formula 12, 31.3 parts by weight (0.1 mole) of 3-nitro-ω-(4-hydroxyethoxybenzylidene) - acetophenone and 10 parts by weight of pyridine are dissolved in about 250 parts by volume of anhydrous acetone. 18.8 parts by weight (0.1 mole) of vinyl phosphonic acid dichloride are introduced dropwise with good stirring and the reaction solution is then heated, under reflux, at the boiling point for about 2 hours. After the solvent has been distilled off, the oily reaction product which remains is well mixed with about 70 parts by volume of 2 N hydrochloric acid. In a short time, the vinyl phosphonic acid monoester separates out in solid form. It is filtered off with suction, washed with water and dried on clay. From toluene, it crystallizes in light yellow prisms which melt at 138° C.

*Example 15*

1 part by weight of the compound corresponding to Formula 3, 0.5 part by weight of an interpolymer from vinyl chloride, vinyl acetate and maleic acid, which is commercially available under the trademark "Hostalit" CAM, and 0.1 part by weight of dicinnamylidene acetone are dissolved in 100 parts by volume of glycol monomethyl ether. This solution is coated upon a mechanically roughened aluminum foil by known methods. The foil is dried in a hot air current and then further dried for about two minutes at 100° C. The sensitized foil is exposed under a negative master for two minutes. For this purpose, an enclosed 18-amp carbon arc lamp is used at a distance of about 70 cm. For the development of the image produced on the coated layer, the exposed side of the foil is treated by means of a cotton pad with 10% phosphoric acid containing 0.5% of sodium fluoride. After the inking up process, copies can be prepared in a printing machine from the resultant printing plate.

It will be obvious to those skilled in the art that many modifications may be made within the scope of the present invention without departing from the spirit thereof, and the invention includes all such modifications.

What is claimed is:

1. A presensitized printing plate comprising a base material having a coating thereon comprising a compound selected from the group consisting of a monomer and polymers thereof, the monomer having the formula

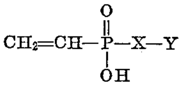

in which X is selected from the group consisting of

—O—$CH_2$—$CH_2$—O—$C_6H_4$—CO—CH=CH—

—O—$CH_2$—$CH_2$—O—$C_6H_4$—CO—CH=CH—CH=CH—

—O—$CH_2$—$CH_2$—O—$C_6H_4$—CH=CH—CO— and

—O—$CH_2$—$CH_2$—O—$C_6H_4$—CH=CH—CO—CH=CH— and Y is selected from the group consisting of aryl and five membered ring groups including a single hetero atom selected from the group consisting of oxygen, nitrogen, and sulfur.

2. A presensitized printing plate according to claim 1 in which Y is a phenyl group.

3. A presensitized printing plate according to claim 1 in which Y is a p-methoxyphenyl group.

4. A presensitized printing plate according to claim 1 in which Y is a 3,4-methylene dihydroxyphenyl group.

5. A presensitized printing plate according to claim 1 in which the compound has the formula

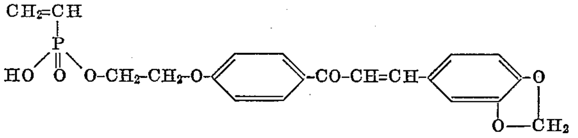

6. A presensitized printing plate according to claim 1 in which the compound has the formula

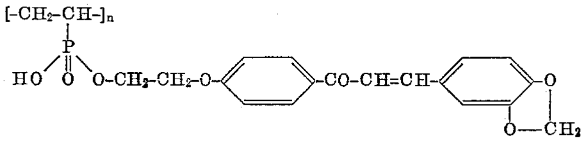

in which $n$ is an integer greater than 1.

7. A presensitized printing plate according to claim 1 in which the compound has the formula

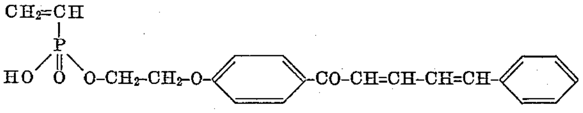

8. A presensitized printing plate according to claim 1 in which the compound has the formula

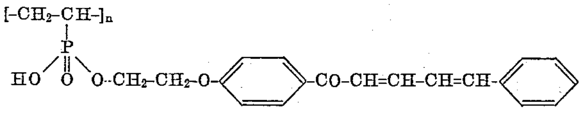

in which $n$ is an integer greater than 1.

9. A presensitized printing plate according to claim 1 in which the compound has the formula

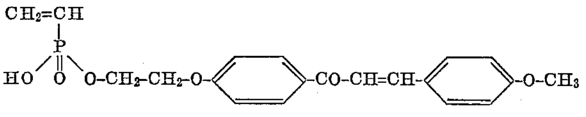

10. A presensitized printing plate according to claim 1 in which the compound has the formula

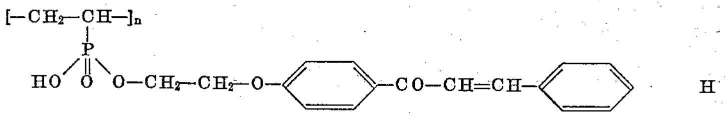

in which $n$ is an integer greater than 1.

11. A presensitized printing plate according to claim 1 in which the compound has the formula

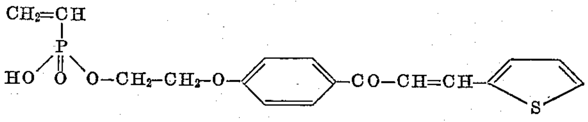

12. A presensitized printing plate according to claim 1 in which the compound has the formula

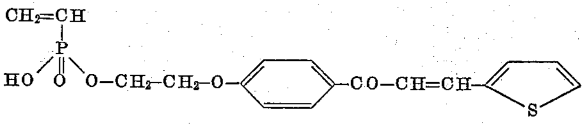

13. A presensitized printing plate according to claim 1 in which the compound has the formula

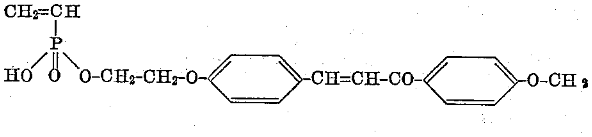

14. A presensitized printing plate according to claim 1 in which the compound has the formula

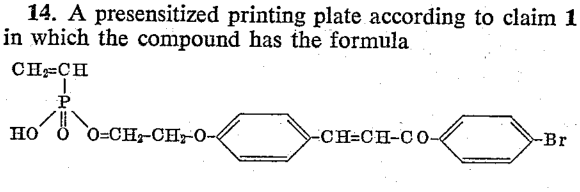

15. A presensitized printing plate according to claim 1 in which the compound has the formula

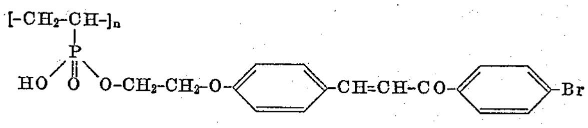

in which $n$ is an integer greater than 1.

16. A presensitized printing plate according to claim 1 in which the compound has the formula

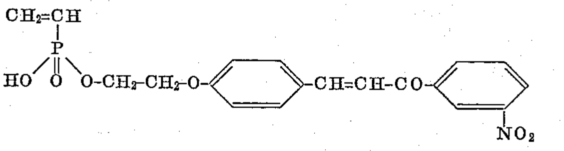

17. A presensitized printing plate according to claim 1 in which the coating includes a resin free of phosphonic groups.

18. A presensitized printing plate according to claim 1 in which the base material is aluminum.

19. A process for preparing a printing plate which comprises exposing to light under a master a base material having a light-sensitive layer thereon and developing the resulting image with a liquid selected from the group consisting of water and aqueous weakly alkaline solvents, the layer comprising a compound selected from the group consisting of a monomer and polymers thereof, the monomer having the formula

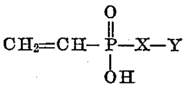

in which X is selected from the group consisting of $-O-CH_2-CH_2-O-C_6H_4-CO-CH{=}CH-$ $-O-CH_2-CH_2-O-C_6H_4-CO-CH{=}CH-CH{=}CH-$ $-O-CH_2-CH_2-O-C_6H_4-CH{=}CH-CO-$ and $-O-CH_2-CH_2-O-C_6H_4-CH{=}CH-CO-CH{=}CH-$ and Y is selected from the group consisting of aryl and five membered ring groups including a single hetero atom selected from the group consisting of oxygen, nitrogen, and sulfur.

20. A process according to claim 19 in which Y is a phenyl group.

21. A process according to claim 19 in which Y is a p-methoxyphenyl group.

22. A process according to claim 19 in which Y is a 3,4-methylene dihydroxyphenyl group.

23. A process according to claim 19 in which the compound has the formula

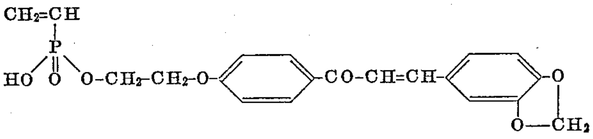

24. A process according to claim 19 in which the compound has the formula

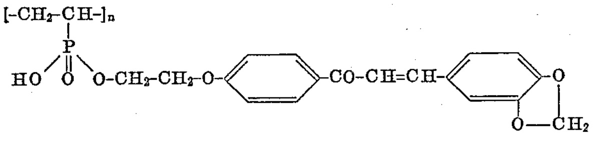

in which *n* is an integer greater than 1.

25. A process according to claim 19 in which the compound has the formula

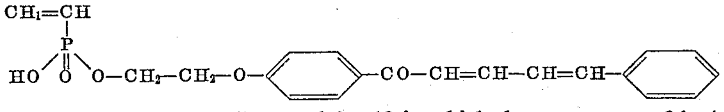

26. A process according to claim 19 in which the compound has the formula

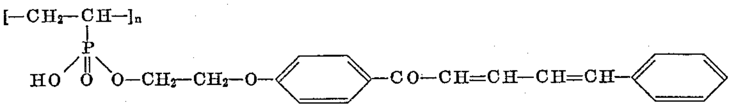

in which *n* is an integer greater than 1.

27. A process according to claim 19 in which the compound has the formula

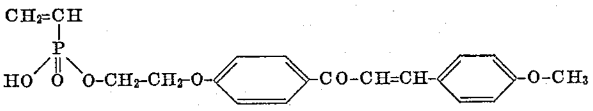

28. A process according to claim 19 in which the compound has the formula

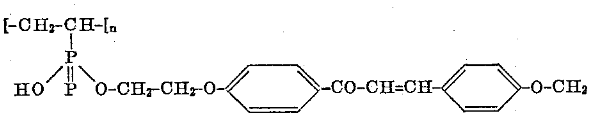

in which *n* is an integer greater than 1.

29. A process according to claim 19 in which the compound has the formula

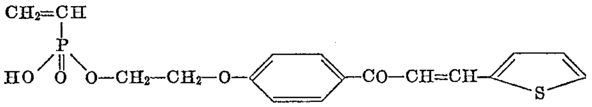

30. A process according to claim 19 in which the compound has the formula

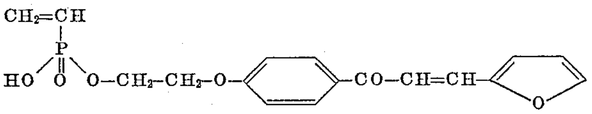

31. A process according to claim 19 in which the compound has the formula

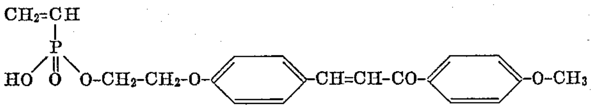

32. A process according to claim 19 in which the compound has the formula

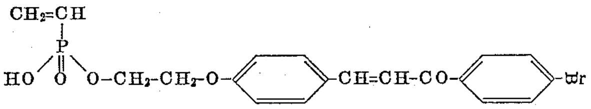

33. A process according to claim 19 in which the compound has the formula

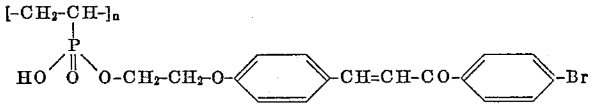

in which *n* is an integer greater than 1.

34. A process according to claim 19 in which the compound has the formula

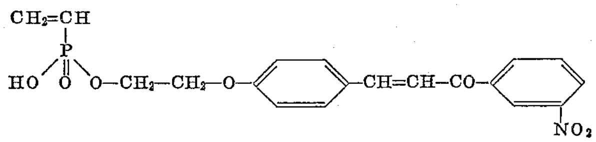

35. A process according to claim 19 in which the layer includes a resin free of phosphonic groups.

36. A process according to claim 19 in which the base material is aluminum.

References Cited by the Examiner

UNITED STATES PATENTS

| | | | |
|---|---|---|---|
| 2,557,805 | 6/51 | Upson | 260—90 |
| 2,784,208 | 3/57 | Ries | 260—461 |
| 2,787,546 | 4/57 | Smith et al. | 96—115 |
| 3,046,110 | 7/62 | Schmidt | 96—33 |

NORMAN G. TORCHIN, *Primary Examiner.*